United States Patent
Lopez

(10) Patent No.: US 10,473,145 B2
(45) Date of Patent: Nov. 12, 2019

(54) LENGTH-ADJUSTABLE CONTROL ROD

(71) Applicant: Airbus Operations (S.A.S.), Toulouse (FR)

(72) Inventor: José Lopez, Bellesserre (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 16/175,288

(22) Filed: Oct. 30, 2018

(65) Prior Publication Data

US 2019/0136905 A1 May 9, 2019

(30) Foreign Application Priority Data

Nov. 6, 2017 (FR) ...................... 17 60364

(51) Int. Cl.
*F16C 7/06* (2006.01)

(52) U.S. Cl.
CPC ............ *F16C 7/06* (2013.01); *F16C 2226/74* (2013.01); *F16C 2226/80* (2013.01)

(58) Field of Classification Search
CPC ...................................................... F16C 7/06
See application file for complete search history.

(56) References Cited

U.S. PATENT DOCUMENTS

| | | | |
|---|---|---|---|
| 5,906,450 A * | 5/1999 | Ng ........................... | F16G 11/12 403/22 |
| 6,902,342 B1 * | 6/2005 | Ditzler ...................... | F16B 7/06 403/78 |
| 7,163,216 B2 * | 1/2007 | McLaughlin .......... | B60G 7/003 280/93.51 |
| 7,179,011 B1 * | 2/2007 | Cohen ...................... | F16B 7/06 403/315 |
| 9,732,786 B2 | 8/2017 | Trotter et al. | |
| 2016/0003290 A1 | 1/2016 | Trotter et al. | |

FOREIGN PATENT DOCUMENTS

EP 0492289 A1 7/1992

OTHER PUBLICATIONS

French Search Report for French Application No. 1760364 dated Jul. 27, 2018.

* cited by examiner

*Primary Examiner* — Vicky A Johnson
(74) *Attorney, Agent, or Firm* — Jenkins, Wilson, Taylor & Hunt, P.A.

(57) ABSTRACT

A length-adjustable control rod includes a first part including a cylindrical peripheral face which has a succession of peripheral grooves separated from one another and positioned in transverse planes. A second part includes a barrel configured to at least partially receive the first part and which has several cutouts configured to divide up the barrel into several cylinder sectors and at least one inner rib, protruding from the inner lateral face of the barrel, which has a section configured to be housed in one of the peripheral grooves.

9 Claims, 1 Drawing Sheet

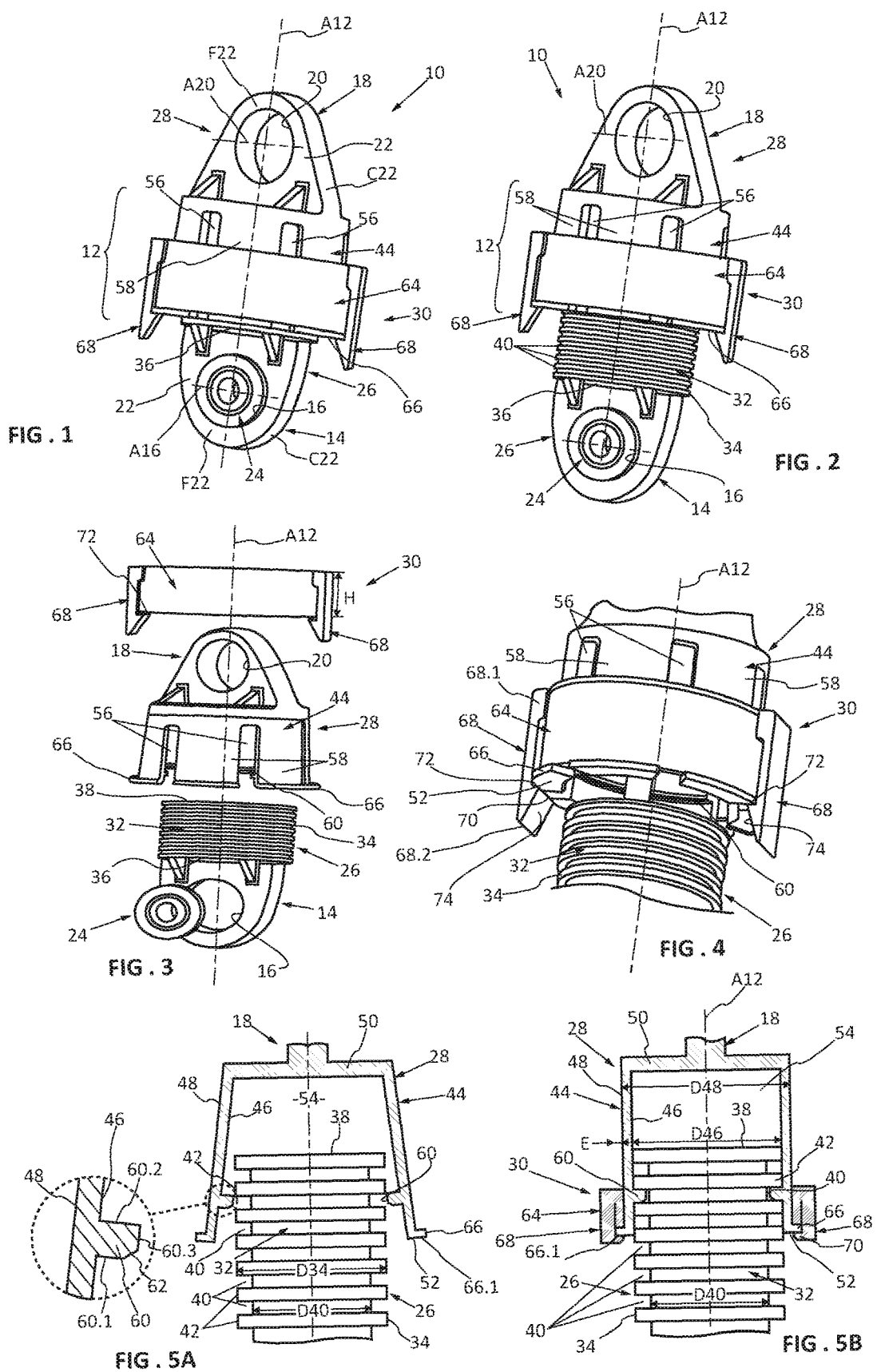

LENGTH-ADJUSTABLE CONTROL ROD

CROSS-REFERENCE TO RELATED APPLICATION

This application claims the benefit of and priority to French patent application number 17 60364 filed on Nov. 6, 2017, the entire disclosure of which is incorporated by reference herein.

TECHNICAL FIELD

The present disclosure relates to a length-adjustable control rod.

BACKGROUND

As is known, a control rod comprises:
a slender body which has a longitudinal axis,
a first fixing head, positioned at a first end of the body, comprising a first through-hole which has a first axis secant to the longitudinal axis, and
a second fixing head, positioned at a second end of the body, comprising a second through-hole which has a second axis secant to the longitudinal axis.

Functionally, a control rod makes it possible to link two elements by maintaining a constant distance and ensuring the transmission of the forces between the two linked elements.

Hereinafter in the description, the length of the control rod corresponds to the center distance, separating the first and second axes, measured on the longitudinal axis.

According to an embodiment, to obtain a length-adjustable control rod, the body comprises a first part, which has a tapped barrel, and a second part, which has a threaded rod comprising a single continuous thread in the form of a helix configured to be screwed into the tapped barrel of the first part. Thus, it is possible to modify the length of the control rod by screwing the first and second parts relative to one another to a greater or lesser extent. A lock-nut is provided to immobilize the first and second parts in the set position.

According to this embodiment, it is not possible to modify the length of the control rod without modifying the orientation of one of the first and second axes of the through-holes.

SUMMARY

The present disclosure aims to remedy the drawbacks of the prior art.

To this end, the subject of the disclosure herein is a control rod comprising first and second parts each having a fixing head,
the first part comprising a cylinder, coaxial to a longitudinal axis, which has a peripheral face,
the second part comprising a barrel, coaxial to the longitudinal axis when the first and second parts are assembled, which has an outer lateral face, an inner lateral face, configured to at least partially receive the cylinder of the first part and having an inner diameter substantially equal to the diameter of the peripheral face of the first part and an annular end rim linking the inner and outer lateral faces.

According to the disclosure herein, the peripheral face of the first part comprises a succession of peripheral grooves separated from one another, positioned in transverse planes and which each extend over all the circumference of the first part. In parallel, the barrel comprises several cutouts, configured to divide up the barrel into several cylinder sectors between the cutouts, and at least one inner rib, protruding from the inner lateral face, which has a section configured to be housed in one of the peripheral grooves of the first part, the barrel being configured to occupy a first state, in which the cylinder sectors are pressed against the peripheral face of the first part and in which the inner rib is housed in one of the peripheral grooves, and a second state in which the inner rib is positioned outside of the peripheral grooves.

According to the disclosure herein, the succession of peripheral grooves makes it possible to adjust the center distance of the control rod. With the peripheral grooves being separated and positioned in transverse planes, the first and second parts of the control rod can pivot relative to one another without the center distance being modified.

According to another feature, the control rod comprises a first locking system, configured to hold the barrel in the first state, which comprises a ring configured to occupy a first position in which the ring is fitted around the barrel and holds it in the first state and a second position in which the ring is withdrawn from the barrel.

According to a configuration, the barrel comprises an outer rib, protruding from the outer lateral face, positioned so as to immobilize the ring in the first position.

According to an embodiment, the outer rib is positioned level with the annular end rim and has a bottom face in the same plane as the annular end rim.

According to another feature, the control rod comprises a second locking system, configured to hold the ring in the first position, which comprises at least one hook having a first end linked to the ring and a second end configured to cooperate with the outer rib of the barrel.

According to a configuration, each hook comprises a tongue which includes a notch having a stop face, substantially at right angles to the longitudinal axis when the ring is in the first position, the stop face being configured to bear against a bottom face of the outer rib when the ring is in the first position.

According to an embodiment, each hook comprises an inclined flat configured to favor the placement of the ring in the first position.

According to another feature, the inner rib has forms favoring the introduction of the first part of the control rod into the barrel of the second part.

According to a configuration, the inner rib is at a distance from the annular end rim.

According to another feature, the first state corresponds to a non-deformed state of the barrel and the second state corresponds to an elastically deformed state of the barrel.

BRIEF DESCRIPTION OF THE DRAWINGS

Other features and advantages will emerge from the following description of the disclosure herein, the description being given purely by way of example, in light of the attached drawings in which:

FIG. 1 is a perspective view of a control rod set to a first length which illustrates an embodiment of the disclosure herein;

FIG. 2 is a perspective view of the control rod, visible in FIG. 1, set to a second length;

FIG. 3 is an exploded view of the various elements of the control rod visible in FIG. 1;

FIG. 4 is a perspective view of a part of the control rod, visible in FIG. 1, in the disassembled state;

FIG. 5A is a diagram of a part of a length-adjustable control rod which illustrates an embodiment of the disclosure herein in the disassembled state; and FIG. 5B is a diagram of a part of the length-adjustable control rod visible in FIG. 5A in the assembled and set state.

DETAILED DESCRIPTION

According to an embodiment visible in FIGS. 1 and 2, a control rod 10 comprises:
- a body 12 which has a longitudinal axis A12,
- a first fixing head 14, positioned at a first end of the body 12, comprising a first through-hole 16 which has a first axis A16 secant to the longitudinal axis A12, and
- a second fixing head 18, positioned at a second end of the body 12, comprising a second through-hole 20 which has a second axis A20 secant to the longitudinal axis A12.

According to an embodiment, each fixing head 14, 18 comprises a plate 22 which has two faces F22 parallel to one another and to the longitudinal axis A12 and a rim C22 which has an approximately triangular profile with a rounded apex. According to a configuration, the first and second through-holes 16, 20 emerge on the faces F22 and the first and second axes A16, A20 are at right angles to the faces F22.

At least one of the first and second through-holes 16, 20 can be equipped with a bearing 24, a rolling bearing, a sliding ring to obtain a pivoting link between one of the fixing heads of the control rod and an axis to which the control rod is linked.

The disclosure herein is not limited to this embodiment for the fixing heads 14, 18.

To obtain a length-adjustable control rod, the body 12 comprises first and second parts 26, 28 configured to cooperate with one another according to several positions, as a function of the desired length, and a first locking system 30 for holding the first and second parts 26, 28 in the desired position.

The first part 26 supporting the first fixing head 14 comprises a cylinder 32, coaxial to the longitudinal axis A12, which has a peripheral face 34, a first terminal face 36 supporting the first fixing head 14 and a second terminal face 38 oriented towards the second part 28 when the first and second parts are assembled.

As illustrated in detail in FIGS. 5A and 5B, the peripheral face 34 comprises a succession of peripheral grooves 40, separated from one another, positioned in transverse planes (at right angles to the longitudinal axis A12). Each peripheral groove 40 extends over all the circumference of the first part 26. The peripheral grooves 40 are separated by protruding ribs which form notches 42.

According to an embodiment, the peripheral face 34 comprises an alternation of peripheral grooves 40 and of notches 42 from the first terminal face 36 to the second terminal face 38. As a variant, the peripheral face 34 comprises an alternation of peripheral grooves 40 and of notches 42 only over a portion of the height of the peripheral face 34.

According to a configuration, the peripheral grooves 40 are all identical. They have, in a longitudinal plane, a U section with branches positioned in transverse planes. The same applies for the notches 42. The peripheral grooves 40 have a diameter referenced D40 and the peripheral face 34 has a diameter D34.

Whatever the embodiment, the alternation of peripheral grooves 40 and of notches 42 extends over a height corresponding to the difference between the minimum and maximum lengths of the control rod 10.

The forms of the peripheral grooves 40 and of the notches 42 are determined as a function of the mechanical characteristics sought and of the desired adjustment accuracy, the spacing between two successive peripheral grooves 40 corresponding to the pitch of the adjustment of the length of the control rod 10.

To reduce the weight of the control rod 10, the cylinder 32 of the first part can be hollow.

The second part 28 supporting the second fixing head 18 comprises a cylindrical and hollow barrel 44, coaxial to the longitudinal axis A12 when the first and second parts 26, 28 are assembled, which has an inner lateral face 46, an outer lateral face 48, a transverse wall 50 at a first end of the barrel 44 (which supports the second fixing head 18) and an annular end rim 52 at a second end of the barrel 44, positioned in a transverse plane.

The transverse wall 50 and the inner lateral face 46 delimit a housing 54 configured to at least partially receive the cylinder 32 of the first part 26.

The inner lateral face 46 has an inner diameter D46 substantially equal to the diameter D34 of the peripheral face 34 of the first part 26.

The barrel 44 comprises several cutouts 56 which link the inner and outer lateral faces 46, 48 and which extend from the annular end rim 52 over a certain height so as to divide up the barrel 44 into several cylinder sectors 58 between the cutouts 56. According to a configuration visible in FIG. 3, the cutouts 56 extend from the annular end rim 52 to the transverse wall 50.

The cutouts 56 are substantially parallel to the longitudinal axis A12.

According to the embodiment visible in FIGS. 1 and 2, the barrel 44 comprises six cutouts 56, uniformly distributed over its circumference, and six cylinder sectors 58.

Each cylinder sector 58 is elastically deformable to allow the part of the annular end rim 52 of each cylinder sector 58 to occupy a position more or less distant from the longitudinal axis A12, as illustrated in FIGS. 5A and 5B.

The inner lateral face 46 comprises at least one inner rib 60, protruding towards the longitudinal axis A12 from the inner lateral face 46, positioned in a transverse plane and which has a section in a longitudinal plane (plane passing through the longitudinal axis A12) configured to be housed in one of the peripheral grooves 40. According to a configuration, the inner rib 60 extends over all the circumference of the inner lateral face 46, apart from the cutouts 56.

According to an embodiment, the inner rib 60 is at a distance from the annular end rim 52.

In a first state illustrated by FIG. 5A, the barrel 44 is cylindrical, the cylinder sectors 58 are pressed against the peripheral face 34 of the first part 26 and the inner rib 60 is housed in one of the peripheral grooves 40.

In a second state illustrated by FIG. 5B, the barrel 44 has a flared form, the ends of the cylinder sectors 58 are further separated from the longitudinal axis A12 compared to the first state and the inner rib 60 is positioned outside of the peripheral grooves 40.

The first state corresponds to the non-deformed state of the barrel 44 and the second state corresponds to an elastically deformed state. Elastically deformed should be understood to mean that the barrel 44 reverts to the non-deformed first state in the absence of stress.

The inner rib 60 comprises a first annular transverse face 60.1 (in a transverse plane) oriented towards the annular end rim 52, a second annular transverse face 60.2 (in a transverse plane) oriented towards the transverse wall 50, parallel to the first annular transverse face 60.1, and a cylindrical rim 60.3 which links the first and second annular transverse faces 60.1 and 60.2.

According to an embodiment, the inner rib 60 comprises a first chamfer 62, which links the first annular transverse face 60.1 and the cylindrical rim 60.3 to favor the deformation of the cylinder sectors 58 when the first part 26 is introduced into the barrel 44 of the second part 28. The inner rib 60 can comprise a second chamfer which links the second annular transverse face 60.2 and the cylindrical rim 60.3.

As a variant, the rim 60.3 may not be cylindrical but tapered to favor the introduction of the first part 26 into the barrel 44.

According to another feature, the first locking system 30 comprises a ring 64 configured to be fitted onto the barrel 44 in order to hold it in the first state. The ring 64 has an inner diameter substantially equal to the outer diameter D48 of the outer lateral face 48 of the barrel 44. The height H of the ring 64 is greater than or equal to the distance separating the annular end rim 52 and the second annular transverse face 60.2 of the rib 60.

Thus, the ring 64 is configured to occupy a first position, visible in FIG. 5B, in which it is fitted around the barrel 44 and holds it in the first state and a second position, visible in FIG. 5A, in which the ring 64 is withdrawn from the barrel 44.

The barrel 44 comprises an outer rib 66 protruding outwards from the barrel 44 from the outer lateral face 48 and positioned so as to immobilize the ring 64 in the first position. According to a configuration, the outer rib 66 is positioned level with the annular end rim 52 and has a bottom face 66.1 in the same plane as the annular end rim 52.

According to a configuration, this outer rib 66 extends over all the circumference of the outer lateral face 48, apart from the cutouts 56.

In the first position, the ring 64 comes into abutment against the outer rib 66. According to a configuration, the ring 64 has a thickness E substantially equal to the height of the outer rib 66 (dimension taken in a direction at right angles to the longitudinal axis A12).

According to another feature, the control rod 10 comprises a second locking system configured to hold the ring 64 in the first position.

This second locking system comprises at least one hook 68, which has a first end 68.1 linked to the ring 64 and a second end 68.2 configured to cooperate with the outer rib 66 of the barrel 44.

According to an embodiment, the second locking system comprises two diametrically opposite hooks 68.

Each hook 68 comprises a tongue, parallel to the longitudinal axis A12 when the ring 64 is in the first position, which comprises, on its inner face (oriented towards the center of the ring 64) a notch 70.

This notch 70 has a stop face 72, substantially at right angles to the longitudinal axis A12 when the ring 64 is in the first position, which is configured to bear against the bottom face 66.1 of the outer rib 66. The hook 68 comprises an inclined flat 74 configured to favor the placement of the ring 64 in the first position. This inclined flat 74 is provided on the inner face of the tongue and extends from the stop face 72 to the point of the end of the tongue.

When the ring 64 is in the first position, the stop face 72 of each hook 68 comes into abutment against the bottom face 66.1 of the outer rib 66 of the barrel 44 and prevents the withdrawal of the ring 64. The hooks 68 are sufficiently flexible to be deformed elastically outwards from the ring 64 in order to withdraw the ring 64 or allow the notch 70 to pass under the outer rib 66 when placing the ring 64. The inclined flat 74 favors this deformation.

The principle of operation of the control rod 10 is now described.

Initially, the first part 26 is introduced into the barrel 44 of the second part 28. The cylinder sectors 58 separate each time the inner rib 60 passes a notch 42. The form of the inner rib 60 favors the passage of the notches 42. The inner rib 60 is immobilized in one of the peripheral grooves 40 according to the center distance desired between the first and second axes A16, A20. The control rod 10 is set with a minimum center distance in FIG. 1 and a maximum center distance in FIG. 2.

When the center distance is set, the ring 64 is fitted onto the barrel 44 of the second part 28 until it comes into abutment against the outer rib 66 of the barrel 44. During this placement, the hooks 68 are deformed elastically as the outer rib 66 passes the notch 70 of each hook 68. As soon as the notch 70 of each hook 68 has passed the outer rib 66, its stop face 72 comes into abutment against the bottom face 66.1 of the outer rib 66. Consequently, the ring 64 is locked in the first position and holds in position the first and second parts 26 and 28 in the set position.

By virtue of the peripheral grooves 40, the first and second parts 26 and 28 can pivot relative to one another without the center distance being modified.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A control rod comprising:
a first part and a second part, each of the first part and the second part comprising a fixing head;
the first part comprising a cylinder, coaxial to a longitudinal axis, which has a peripheral face;
the second part comprising a barrel, coaxial to the longitudinal axis when the first part and the second part are assembled, which has an outer lateral face, an inner lateral face configured to at least partially receive the cylinder of the first part and having an inner diameter substantially equal to a diameter of the peripheral face of the first part and an annular end rim linking the inner and outer lateral faces;
the peripheral face of the first part comprising a succession of peripheral grooves, separated from one another by notches, positioned in transverse planes and which each extend over all of a circumference of the first part,
the barrel comprising several cutouts configured to divide up the barrel into several cylinder sectors between the cutouts and at least one inner rib, protruding from the inner lateral face, which has a section configured to be housed in one of the peripheral grooves of the first party;

the barrel being configured to occupy a first state, in which the cylinder sectors are pressed against the peripheral face of the first part and in which the inner rib is housed in one of the peripheral grooves, and an elastically deformed second state, in which the inner rib is positioned outside of the peripheral grooves; and a first locking system configured to hold the barrel in the first state, the first locking system comprising a ring configured to occupy a first position, in which the ring is fitted around the barrel and holds it in the first state, and a second position, in which the ring is withdrawn from the barrel.

2. The control rod according to claim 1, wherein the barrel comprises an outer rib, protruding from the outer lateral face, positioned so as to immobilize the ring in the first position.

3. The control rod according to claim 2, wherein the outer rib is positioned level with the annular end rim and has a bottom face in a same plane as the annular end rim.

4. The control rod according to claim 3, wherein the control rod comprises a second locking system configured to hold the ring in the first position and which comprises at least one hook having a first end linked to the ring and a second end configured to cooperate with the outer rib of the barrel.

5. The control rod according to claim 4, wherein each hook comprises a tongue which includes a notch having a stop face, substantially at right angles to the longitudinal axis when the ring is in the first position, the stop face being configured to bear against a bottom face of the outer rib when the ring is in the first position.

6. The control rod according to claim 5, wherein each hook comprises an inclined flat configured to favor placement of the ring in the first position.

7. The control rod according to claim 1, wherein the inner rib has forms favoring introduction of the first part into the barrel of the second part.

8. The control rod according to claim 1, wherein the inner rib is at a distance from the annular end rim.

9. The control rod according to claim 1, wherein the first state corresponds to a non-deformed state of the barrel and the second state corresponds to an elastically deformed state of the barrel.

* * * * *